3,238,084
DEVICE FOR MANUFACTURING REINFORCED PLASTIC MATERIAL
Albert W. Hawkins, Princeton, N.J., assignor to Union Carbide Corporation, a corporation of New York
Filed July 6, 1962, Ser. No. 208,053
4 Claims. (Cl. 156—544)

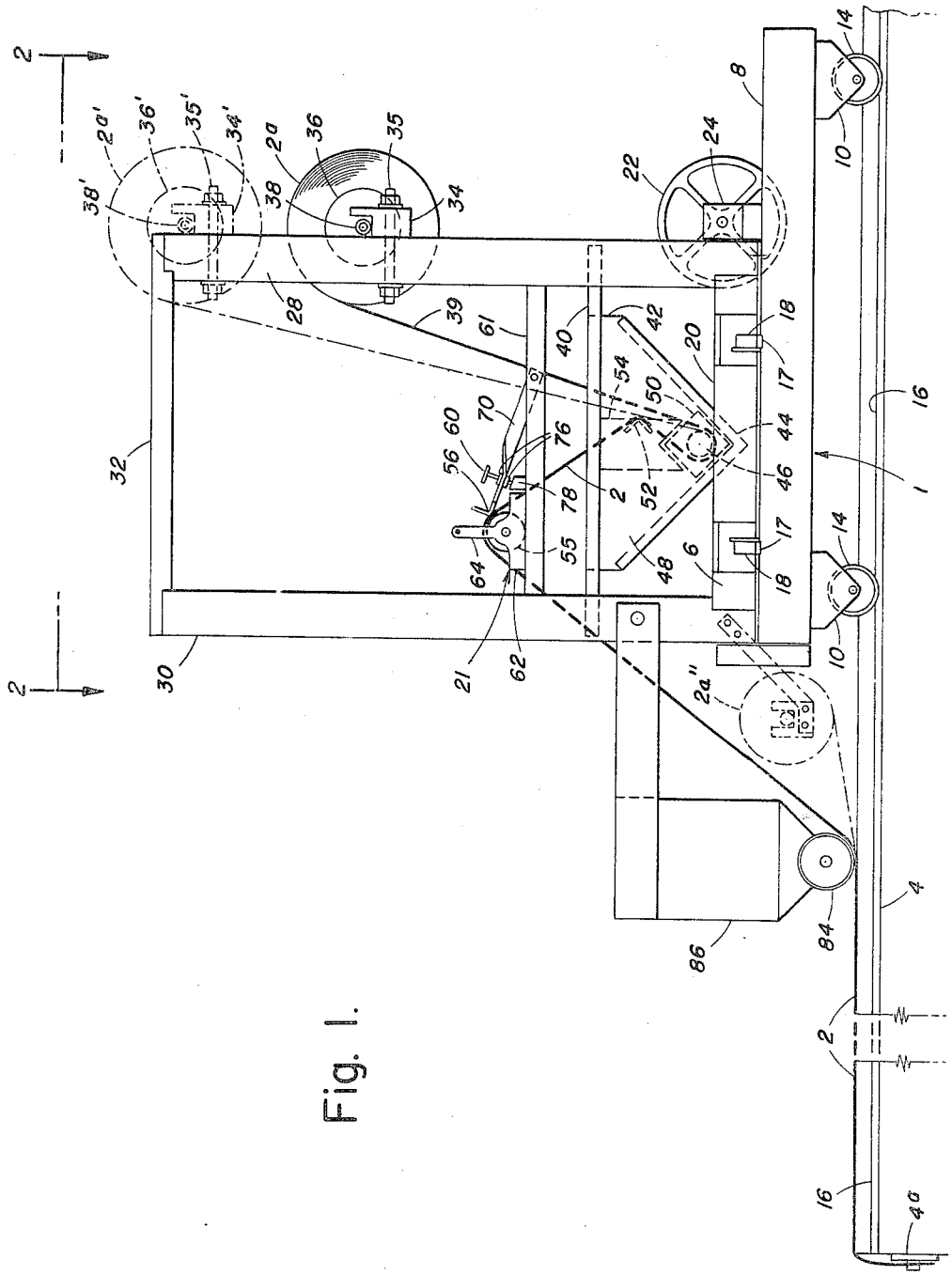

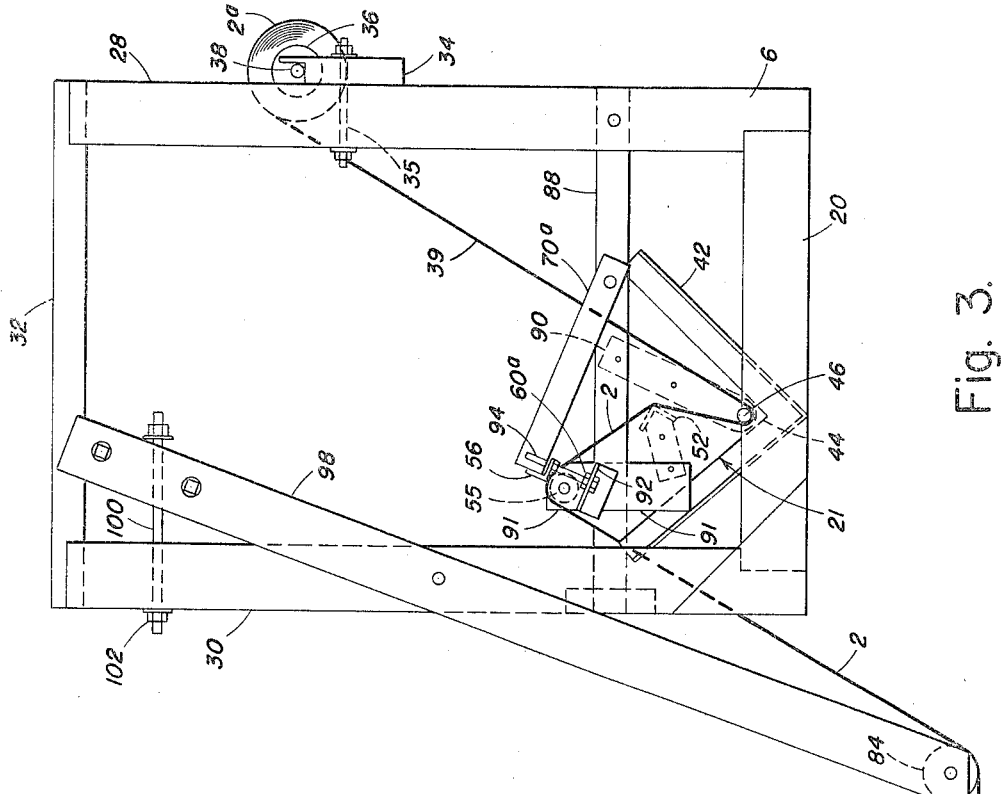
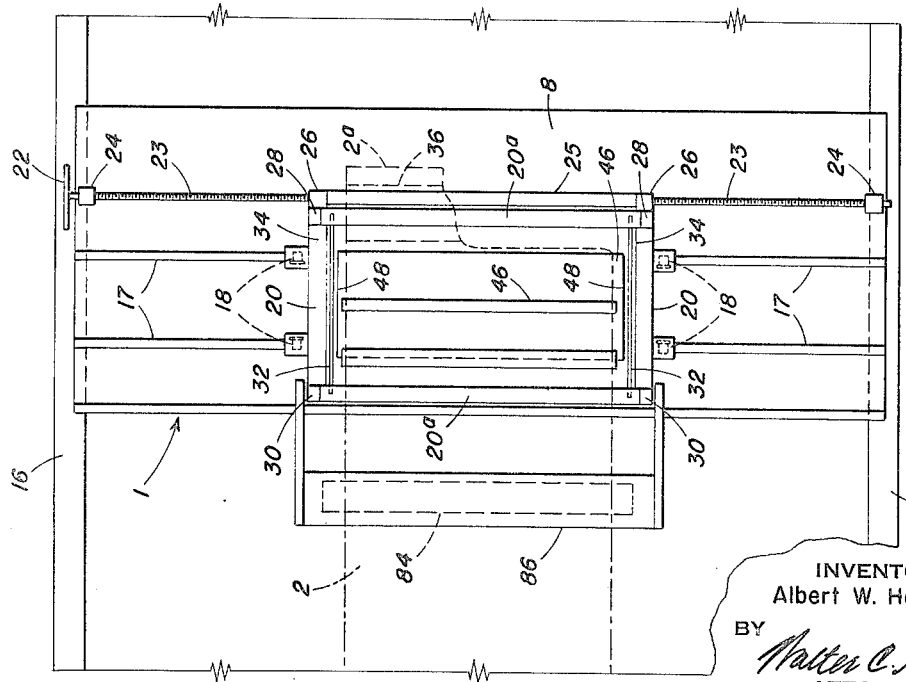

This invention relates to an apparatus for manufacturing reinforced plastic material. More particularly, the present invention relates to an apparatus for effecting the preparation of a plastic sheet formed of a resin deposited on a reinforcing fibrous web or the like.

Methods have been known heretofore for producing reinforced plastic panels and sheet material. Thus, one method which is often termed the hand lay-up method has involved the stretching out of the reinforcing material, e.g. glass fiber, in the dry state with resin deposited thereon from a bucket or the like. The sheet or panel is then finished by hand rolling, brushing or toweling. This method is normally time consuming and the results may vary considerably in the uniformity attained. Space and manpower considerations also render the process substantially uneconomic.

The application of well known resin spraying techniques to manufacture such reinforced panels has also been proposed. In these procedures the reinforcing web is stretched flat again in the dry state and impregnated by a resin spray. It has also been suggested to build up a sheet by spraying and depositing comminuted reinforcing material simultaneously with the resin spray. However, the final finishing, densification and removal of entrapped air must be performed as a separate operation; and again the most effective technique normally is hand rolling. These spray procedures are normally substantially superior to the aforesaid hand lay-up method. However, the spray techniques present significant difficulties as well. Thus, it requires, as indicated, a final rolling, and as a result, where glass mat or chopped rovings are employed for reinforcement particularly, the sheet must be made quite fluid and the ratio of resin to fibrous support material is therefore necessarily in the ratio of three or four parts by weight of resin to one part by weight of fibrous material, e.g. glass fiber. Concomitantly the tensile strength of the resulting sheet material is low, e.g. 10,000 pounds per square inch (p.s.i.). Further, there is inherent in such spray application procedures the tendency toward excessive deposition of resin referred to as "overspray" as well as the associated problem of ventilation and the like.

A third procedure also suggested heretofore involves the use of a stationary laminating machine and take-off conveyor to manufacture reinforced sheet material by a dip process. A principal difficulty of this procedure is the limitation on the utilization of the product sheets or panels and the inconvenience attendant upon use of this procedure in the most attractive and likely areas of use as a result of this limitation.

Thus, reinforced plastic panels or sheets find a wide and substantial utility as the side walls, roof and floor elements of truck and trailer storage compartments and the like, supported normally with a continuous support layer of rib elements or stiffeners formed, illustratively, of steel, aluminum, wood or plastic in conjunction, quite often, with insulating materials, to which the reinforced plastic panels are made to adhere. In accomplishing this result, however, employing the known stationary laminating machine and take off conveyor, the reinforced plastic panel, in each instance, must be manufactured, allowed to cure, and then moved to a large flat surface to facilitate the bonding thereof with the aforesaid support ribbing and insulation. Too, the ribs and insulation must then be bonded to the reinforced plastic panel with a separate application of adhesive so that two curing stages are requisite; one to effect curing of the plastic of the sheet material and another curing step to effect bonding to the support ribbing or insulation by curing of the adhesive in contact therewith. Further, the apparatus involved, particularly the conveyor belt of substantial dimensions required for this method of operation, is both costly to install and to maintain. Thus, the finished sides, ends, roof and floors of trucks and the like are normally required to be, for example, eight feet in height and twenty-four feet in length, while those of trailers are normally eight feet in height and forty feet in length.

Accordingly, it is an object of the present invention to provide an apparatus both from the aspect of installation and maintenance for producing reinforced plastic sheets and laminates of high tensile (e.g. 28,000 p.s.i.) and impact strengths at a significantly high rate of manufacture having, in addition, a substantial resistance to abrasion and which are capable of employment for a diversity of purposes and are adapted particularly to be prepared in such a manner that particular modifications of the desired panels for specific uses can be accomplished with facility and by a method which is essentially continuous when desired; and an apparatus which provides specifically for curing of reinforced plastic sheets or panels and the bonding or adhesion thereof to insulation and/or support ribbing in a single step which is continuous with the formation of the fibrous reinforcement component and continuous resin phase into an integral reinforced sheet or panel. Other significant objectives of the present invention include the provision of apparatus which is capable of easy assembly and ready adaptation to various types and thicknesses of reinforcing materials and resins.

These and other marked advantages and objectives of the present invention will become evident in the course of the description appearing hereinafter.

Accordingly, the present invention comprises, briefly, a substantially flat horizontally disposed stationary bed, means for attaching one end of a continuous fibrous reinforcing fabric to one end of said bed, a movable carriage mounted thereon and adapted to traverse said bed, a support frame mounted on said carriage and adapted for lateral adjustment and positioning thereon in a direction substantially at right angles to the direction of movement to which said carriage is adapted, and a treating apparatus disposed thereon and including a dispensing means such as a mandrel adapted for free rotation to dispense said continuous fabric therefrom as the carriage is moved across said stationary bed away from the point of attachment of said continuous fabric to said bed, a receptacle or immersion tank for liquid resin and means for securing the passage of said continuous fabric through said receptacle or tank and thus through the resin contained therein when present, means for controlling the amount of said resin retained on said continuous fabric material after passage thereof through said tank or receptacle, such as a pair of squeeze rolls, leveling bar or a plurality of doctor bars or blades, and pressure means such as a pressure roll, for effecting downward impressment of the resulting resin-impregnated fabric against the upper surface of said bed or a laminate forming layer, i.e. ribbing or other continuous support material, insulation or combinations thereof, positioned on said bed, as said carriage is moved across said bed and away from the point of attachment thereto of said continuous fibrous reinforcing material.

A more detailed description of this invention appears hereinafter and is considered in concert with the accompanying drawing showing illustrative embodiments of the invention.

The drawings are as follows:

FIGURE 1 is a side elevational view of an illustrative embodiment of the invention.

FIGURE 2 is a top view of the apparatus of FIGURE 1 viewed from above, with parts removed or broken away to disclose various structural relationships.

FIGURE 3 is a fragmentary side elevation of a modication of the invention embodied in FIGURE 1.

Referring more particularly to the accompanying drawings, in which like numbers in the written description and drawings designate like parts, the invention is seen to comprise a movable carriage or dolly 1 mounted on a flat bed matrix or table 4; continuous resin-impregnated fibrous reinforcing fabric 2 being deposited from the former onto the latter as the carriage proceeds along its course in the operative phase as described hereinafter; one end of the reinforcing fabric 2 being affixed to the head end 4a of the bed or table 4 prior to movement rearwardly of the carriage from the aforesaid head of the stationary bed 4 and deposition of resin thereon. This attachment of fabric 2 to head end 4a may be before the impregnation of fabric 2a starts. The carriage 1 comprises frame 6, the rectangular base support element or platform 8 and the downwardly disposed bosses 10 and wheels 14 positioned at the corners thereof to provide for free rotary movement thereof about an axis vertical to said bosses 10.

The four wheels 14 thus mounted are adapted to roll in guide ways 16, and move the carriage 1 the length of the stationary flat bed 4, the guide ways 16 being positioned along the lateral margins of the stationary bed 4. The guide ways 16 may be formed by a depression of the lateral margins of the flat bed matrix 4 as seen in FIGURES 1 and 2 or by insertion of an upwardly disposed fin adjacent the lateral borders of the bed 4.

Mounted transversely on the platform or base support element 8 are a plurality, normally two in number, of tracks 17 upon which are disposed the rollers 18 attached in freely rotatable fashion to the laterally disposed crossbars 20, which are positioned at right angles to the tracks 17. Like cross-bars 20a are provided transversely being engated at their opposite extremities with the opposite extremities of the laterally disposed cross-bars 20. The laterally and transversely disposed cross-bars 20 and 20a respectively thus provide the rectangular base support of the frame 6. The rollers 18 attached to the lateral crossbars 20 provide for lateral movement to a desired position of the frame 6 and the treating apparatus 21 disposed therein and to be described hereinafter.

Positioning of the aforesaid treating apparatus 21 with respect to lateral movement is normally and conveniently effected by means of the handle 22 which operates the transverse rod 23 and is disposed at one end thereof, the rod 23 being supported in the twin laterally located and upwardly disposed bosses 24 mounted on platform 8 and is so mounted therein as to be subject to rotary movement by the aforesaid handle 22; the handle 22 being provided on one side of the platform 8, in the illustrated embodiment. The transverse rod 23 in threaded engagement with the sleeve 25 is joined to the rear upright support frame elements 28 by the brackets 26 positioned thereon near the bases thereof. The upright elements 28 and 30 are mounted upon, and at the nexus of, the transverse and lateral cross-bars 20 and 20a, respectively.

The upper ends of the rear and forward support bars, 28 and 30 respectively, are connected by horizontally disposed supporting rods 32. On the rear support bars 28 are positioned the brackets 34, which may be pegged at various elevations thereon by any conventional means, for example, by employment of rods 35 passing through brackets 34 and the uprights 28. Two or more pairs of such brackets may be provided if it is desired to apply multiple layers of reinforcing cloth as shown in alternative in dotted lines as brackets 34. The mandrel 36 holding rolls of reinforcing cloth 2a and/or 2a' is adapted to rotate about the axis 38, the ends of which are disposed in the aforesaid brackets 34. It is upon this mandrel 36 that the fibrous support material, e.g. glass cloth, is rolled initially and unwound in the course of preparing the desired reinforced plastic sheet material. Due to the disposition of the brackets 34 in the slideways of the bars 28, the mandrel may be raised or lowered as seen fit by the operator, as described above.

For rapidly building up the thickness of the lay-up, it is sometimes desired to simultaneously lay-up two or more layers of the reinforcing cloth 2a and 2a' as illustrated in FIGURE 1, or a fine surface finished material 2a and a coarser and bulkier material 2a' may be layed up together for faster production.

Cross-pieces 40, two in number, are disposed between the uprights 28 and 30 of the frame and supported thereby. These cross-pieces 40 serve to carry the dip trough or immersion tank 42 containing the resin to be applied to the fibrous web 2a to be passed from the mandrel 36. The immersion tank 42, in the illustrated embodiments, is dependent from the cross-pieces 40 to which it is attached at its lateral borders. The height of the crosspieces 40 on the uprights 28 and 30 may, in turn, be adjusted. The immersion tank 42, as shown, represents transversely a V-shape or U-shape trough, the apex 44 of which is, of course, inverted or downwardly disposed. Immediately above the aforesaid apex 44 and positioned along its length is the immersion roll 46. This roll is rotatably mounted to the inner opposite side walls 48 of the tank 42, by means of the brackets 50 shown in broken line representation, in FIGURE 1. The immersion roll 46 assures that the continuous fibrous reinforcing material 2a and/or 2a' passes into the resin contained in the dip trough 42. Actually, the immersion roll 46 is beneath the liquid level of the resin in trough 42 to impregnate the reinforcing material 2a and/or 2a' with the desired thermosetting resin or plastic. However, for starting up and threading the coating unit it may, if desired, be removable from trough 42 and then immersed into the resin trough 42 when lay-up is started.

Positioned above and slightly behind the immersion roll 46 and above the resin liquid level is the stationary doctor bar 52, a V-shaped element, the apex of which is directed rearwardly. The doctor bar 52 is also mounted at its opposite ends on the inner lateral walls 48 of the tank 42 by means of suitable brackets 54 in the embodiment of FIGURE 1. The impregnated fibrous material 2 passes over the apex of this bar in its upward passage from the immersion roll 46. In so doing it will be apparent that the sheet material 2 proceeds rearwardly as well as upwardly to pass over the aforesaid doctor bar 52, thus providing for a firm biased contact therewith, since the material, in its various states, is drawn forward in the manner described hereinafter. The excess of resin present on the impregnated sheet material 2 is, in this way, removed from one surface thereof, that is the under surface of the material 2a, as it passes through the tank 42 and under the roll 46.

Doctor bar 52 in conjunction with doctor roll 55 and doctor knife 56 provide the means for controlling the amount of resin retained on the fabric. Positioned above the doctor bar 52 and the immersion tank 42 and roll 46 as illustrated is the doctor roll 55 disposed adjacent to and partially under the adjustable doctor knife 56, the latter being mounted in conjunction with the doctor knife adjustment element 60 on the upper cross-pieces 61 disposed in substantially like manner above the previously described lower cross-pieces 40 by attachment at their opposite ends to the upright support elements 28 and 30, as shown in the embodiment of FIGURE 1. The doctor roll 55 is positioned above the forward portion of the immersion tank 42 and is mounted upon a freely rotating axis which is secured at its opposite ends to the cross-pieces 61 by means of the upwardly disposed support brackets 62. As an alternative to doctor knife 56, there may also be used doctor blades on a pivotal mounting, with doctoring pressure being controlled by weights. The weights can be slideably mounted on said arm and retained in the desired position thereon by virtue of notches formed in the upper arm surface and in which said weights are adapted to be seated. It should be noted that both doctoring elements are not needed at the same time but are alternatives. Other obvious alternatives can be used including squeeze rolls. It is desirable to have two or more types or means for controlling the amount of resin picked up or impregnated on the fabric mounted on the unit for handling the various fabrics which are contemplated. For instance, one doctor blade may be positioned nearly at right angles to the fabric 2 on roll 55 for fine or smooth finished fabrics whereas element 56 can be at an angle of 30° to 60° for rougher finished fabrics. The blade element 56 itself, as described, is positioned at one end of an arm 70 approximately mid-way along the length of which is positioned the single knife or blade adjustment element 60 on which are disposed the locking nuts 76 in fixed position and between which passes the arm 70; the adjustment element 60 passing through the arm 70, when constructed in the manner shown in FIGURE 1 rests on support 78 and controls the minimum clearance of the doctor blade 56. The arm 70 is pivoted at its opposite end from that which is continuous with the blade 56 to the upper cross-pieces 61 and is adapted for fixed positioning thereon about an arcurate path. Thus, the operator can readily adjust the distance between the blade 56 and the doctor roll 55. In this manner the thickness of the fabric therebetween may be provided for and the amount and thickness of resin in the sheet 2 being formed may be adjusted, a narrower passage between the roll 55 and blade 56 effecting a greater removal of resin from the sheet 2; the excess resin tending to flow back into the trough or tank 42 in the same manner as that occasioned by the doctor bar 52.

The sheet 2 passes under the doctor blade 56 and over the doctor roll 55 forward and downwardly to the stationary flat bed matrix 4 against which surface it is initially pressed by the stationary pressure roll 84, the latter downward impressment means, as seen in FIGURE 1, being mounted at its opposite ends upon bracket support member 86. The brackets 86 are attached to the forward upright frame support elements 30, in a fixed manner but are subject to adjustment so that the pressure exerted by the roll 84 may be lessened or increased for a period of operation to accord with the density or thickness of the particular materials being processed.

As a further desirable feature of this apparatus but in no way critical to its operation, it is also possible to mount a second roll 2a of thermoplastic film on the head end of carriage 1 shown in FIGURE 1 in dotted lines for simultaneous layup of the film under the impregnated material 2. The thermoplastic film may be of any polymer to serve as a ready means aiding the parting of the cured fabric material 2 from bed 4 and/or for imparting decreased moisture vapor transmission rate, improving solvent, grease or alkali protection to the laminate, or it may carry printed or other decorative matter for imparting signs or designs to the resulting laminate.

After defining a passage under the roll 84, the reinforced sheet material stapled or otherwise affixed at the head end of the bed 4 is maintained in a flat condition therebetween. It will be evident that as the movable carriage 1 proceeds rearwardly on the bed 4 an increasing amount of reinforced uncured plastic material 2 is deposited on the stationary bed 4. The panel of continuous resin impregnated reinforcing fabric or sheeting 2 is cured in situ on the bed 4, a suitable support ribbing and/or insulation being present under said fabric or sheet 2 as it is deposited or placed thereon after deposition of the sheet 2, if desired, but prior to curing, so that only a single step is required to effect curing of the reinforced fabric or sheet 2 per se and adhesion thereto of the desired support ribbing, insulation or the like. The movable carriage 1 is is driven in any conventional manner as, for example, by manual pushing or pulling, or by virtue of a standard automatic drive mechanism; for example, electrically or by means such as an engine or the like attached to the carriage 1 in a standard manner.

Various embodiments of the present invention are, of course, practicable. Illustrative modifications which may be effected in the subject invention are presented in FIGURE 3 wherein it will be noted that a single pair of cross-pieces 88 are used to provide lateral securement of the immersion tank or pan 42, the immersion roll 46, the doctor bar 52, the doctor knife roll 55, the roctor blade 56 and the doctor knife adjustment means 60 either directly or by means of brackets. Thus, the immersion roll is attached to the cross-pieces 88 by means of the dependent brackets 90; the doctor bar 52 is secured to the terminal dependent portion of the brackets 91, which latter elements serve to grip the doctor roll 55 and the doctor blade adjustment means 60a. It will be seen that the adjustment means 60a is inverted in position and modified in structure from that seen in FIGURE 1, although functioning in a similar manner. Thus, the bracket 62 is replaced by laterally directed flanges 92 secured to the brackets 91; the shaft 94 of the adjustment means 60a passing through and being secured to the flange 92; in which position the shaft 94 can be rotated. The opposite end of the shaft 94 is disposed in threaded engagement with orifices defined in the doctor blade 56 and support arm 70a. Rotation of the shaft 94 head thus results in an adjustment of the distance between the blade 56 and the doctor roll 55. It will be evident that the adjustment means 60a posed at the opposite lateral borders of the carriage 1 are connected to the exterior walls of the brackets 91 in this embodiment of the invention. The doctor blade 56 is, accordingly, extended at its lateral margins to accommodate the shafts 94 of the doctor blade adjustment means 60a extending upwardly thereinto in the manner described above. Rather than the single transversely extended arm 70 supporting the blade member as in FIGURE 1 with the adjustment element 60 posed approximately mid-way between the lateral borders of the frame 6, there is thus seen to be present in the modification of FIGURE 3 two arm members 70a attached to the exterior sides of the cross-pieces 88 and connected thereto in a like manner to that of the arm 70 described in FIGURE 1. It will be noted that the doctor knife weights 58, as seen in FIGURE 1, have been eliminated from use in the embodiment of the invention shown in FIGURE 3.

The stationary pressure roll 84 is seen in FIGURE 3 to be supported at its opposite ends by elongate support bars 98 which are mounted in turn upon the upright support elements 30 in a manner similar to that described in FIGURE 1. If desired, however, the upper rear end of each of the bars 98 may be retained in position additionally by a rod 100 threaded at both ends and extending in a horizontal plane through the rear upright frame element 28 and the corresponding bar 98 associated therewith. The nuts 102 positioned contiguous to the upper forward border of the bar 98 may be adjusted to permit the readjustment of the pressure to be exerted on the stationary roll 84 as described with relation to the embodiment of FIGURE 1.

Still other modifications of the subject apparatus in addition to those described hereinabove may be incorporated within the scope of this invention. Thus, the stationary bed 4 can be conveniently constructed so that its underside constitutes an air plenum chamber. Heating coils may be introduced additionally into this latter chamber to heat the bed 4 surface, thus decreasing the cure time required, which is otherwise effected by standard means and may, in fact, be desirably accomplished at room temperature. Further, air slots may be disposed along the lateral borders of the bed 4 when the underside thereof is an air plenum chamber. Hence, when the plenum is under negative pressure from an exhaust fan, the fumes formed therein can be exhautsed through the aforesaid air slots. During curing of the fibrous reinforcing sheet material 2, the hot air blown through these same air slots can be collected and contained within portable or movable hoods placed over the stationary bed 4 surface, again aiding in the curing of the reinforced sheet material 2a. An infra-red heater can also be employed optionally. This element can be mounted on the carriage 1 or upon a separate movable dolly surmounting the bed 4 and can be used to direct heat onto the uncured plastic sheet 2 resting on the stationary bed 4 or for applying heat for post-curing.

Illustrating the mode of operation of the instant device and with particular reference to the embodiment of FIGURES 1 and 2 thereof; a roll of reinforcing material 2a is placed upon the mandrel 36 which is then mounted on the brackets 34 of the carriage 1 which is positioned at the forward end of the stationary bed 4. The reinforcing material 2a is then threaded through the immersion tank 42 under the immersion roll 46 and sequentially upwardly over the rearwardly directed apex of the doctor bar 52, forward and upward between the doctor blade 56 and the doctor roll 55, passing over and downwardly from the latter 55 to the stationary bed or table 4 against which the reinforcing fiber or cloth 2 is impressed by the stationary pressure roll 84. The reinforcing fiber 2 is then fastened to the head end of the table or bed 4 as shown in FIGURE 1. The laminating or impregnating operation is then initiated by introduction of the desired liquid resin into the immersion tank 42. This can be accomplished manually or automatically by well known mixing and dispensing procedures wherein, for example, resin mixtures are placed in their respective containers and fed to a continuous mixer. The introduction of resin into the tank 42 can thus be accomplished either in a batchwise manner at the beginning of the run of reinforcing material 2a or continuously from standard mixing and dispensing equipment in accordance with quantity requirements. After insertion of the liquid resin into the dip trough 42, the carriage 1 is moved rearwardly from the head of the table or bed 4, lengthwise, by means of the wheels 14, along the guide ways 16 of the aforesaid stationary bed 4. This rearward movement of the carriage 1 serves to unwind the reinforcing material 2a from the mandrel 36, and if two sheets are to be layed down simultaneously, also material 2a' from mandrel 36', drawing said material 2 through the liquid resin contained in the dip trough 42 to form the uncured resin-impregnated reinforced sheet 2 which then passes over the doctor bar 52 and, sequentially, between the doctor knife 56 and the doctor roll 55 and from thence into contact with the stationary bed matrix 4 passing under the pressure roll 84 at its point of initial contact with the aforesaid stationary bed or table 4 to effect the application of the resin saturated reinforcing material 39 to the flat bed table 4.

The fibrous sheet material 2 thus formed and doctored may be cut at any desired length and cured upon the stationary bed 4. As indicated heretofore, a laminate may be formed using suitable support ribbing or insulation material or a combination thereof which is deposited on the bed 4 before or during the lay-up of reinforced sheet 2a so that in curing the latter, the adhesion of the continuous layer of support ribbing or insulation, or combined layers thereof is assured simultaneously.

Sheets of varying widths as well as lengths can be provided by the subject process. Indeed, the width of the finally cured reinforced sheeting may be conveniently adjusted to a width far beyond that of the transverse dimensions of the frame support 6 and the treating apparatus 21 contained therein, that is the mandrel 36, dip trough 42, immersion roll 46, doctor bar 52, doctor blade 56 and roll 55 and the pressure roll 84, all of which are normally of substantially the same transverse extension. This is accomplished by the practice of the present invention wherein after deposition of the desired length of uncured reinforced sheet material 2 upon the stationary bed 4 or upon continuous support ribbing and/or insulation as described above, the apparatus mounted upon the platform 8 and supported by the cross-bars 20 is moved laterally on the tracks 17 by means of the rollers 18 and by virtue of the adjustment of the positioning handle 22 as described hereinabove. The carriage 1 is then moved back to the head of the bed 4, that is to that end of the bed 4 to which the previous length of fabric was attached. A second sheet of uncured reinforced material 2 may then be deposited in like manner to the first sheet of fabric, upon the bed 4 or on a lateral extension of the aforesaid support ribbing and/or insulation in substantially side-by-side relation and contiguous with one another with the added width of impregnated sheet or fabric 2 preferably overlapping the second sheet 2. By further lateral movement of the treating apparatus 21, a third sheet 2 may be deposited in a similar manner adjacent to one of the aforesaid previously deposited sheets and the series thereof cured on the bed 4, with or without the laminate forming layer of continuous support ribbing and/or insulation disposed in between continuous impregnated fabric 2 and said bed 4, to form a single integral panel. Thus, the width and length of the manufactured reinforced plastic sheet prepared in accordance herewith depends substantially upon the dimensions of the flat bed 4 surface.

It will be evident that the lateral margins of the carriage 1 are defined substantially by the lateral margins of the bed 4 upon which it is mounted. The lateral or transverse movement of the frame 6 in turn is limited to the outer lateral margins of the carriage.

The reinforced plastic sheeting with or without the support ribbing and/or insulation layer integrated therewith is removed from the bed 4 in any convenient manner. Thus, the sheet in the cured or uncured state may be conveniently severed from the untreated fabric end 2a initially threaded through the treating apparatus 21 and used to create a point of attachment for the continuous reinforcing fabric 2 to the bed 4 so that the fabric is dispensed from the mandrel 36 as the carriage 1 is moved across the bed 4 in the resin impregnating stage to a point remote from the aforesaid point of attachment of said fabric as described above. The fabric sheet may be severed in a similar manner at its opposite end prior to, during, or after curing thereof, from any impregnated fabric material 2 remaining in the treating apparatus, the severance being effected just forward of the pressure roll 84. After the cure has been completed, the resulting panels can then simply be lifted from the stationary bed 4.

The amount of resin or plastic in the impregnated fibrous sheet 2 is, as indicated above, controlled by the clearance and/or pressure provided by the adjustable doctor knife, and, in addition, the longitudinal speed of the movable carriage 1 in relation to the stationary bed 4 in the operative phase. The stationary pressure roll 84, in turn, tends to increase the density of the resin impregnated sheet 2 as finally applied to the bed 4 and is particularly valuable in effecting the removal of entrapped air therefrom.

Suitable illustrative dimensions for the stationary bed or table 4 in accordance with the practice described herein are forty-four feet in length and a width sufficient to accommodate a plurality of fifty inch widths of fibrous reinforced plastic material 2. Employing the subject apparatus including a bed of the aforesaid dimensions, plastic reinforced sheet is produced, illustratively, having a width of fifty inches at the rate of twelve feet per minute. This and similar high rates of production permit the use, most advantageously, of a variety of resin compositions which can be cured at room or elevated temperatures in preparing the continuous reinforced fabric materials of the invention.

Illustrative of the reinforcing materials for use in the apparatus and process of the invention are glass cloth, glass woven rovings, glass mat, burlap, cotton or synthetic fiber cloth, woven paper cloth, sisal and metal mesh.

Any type of thermosetting resin can be used with this apparatus. Particularly desirable are the epoxy, polyester or phenolic resins normally used for making reinforced fabric laminates.

Illustrative of the thermosetting epoxy resins for use in the practice of the invention are the liquid polyepoxides and polyesters described, illustratively, in U.S. Patent 2,965,930, U.S. Patent 2,901,461 and U.S. Patent 2,967,756. Curing of the resin in the sheet is normally effected by the addition of hardeners and catalysts thereto, as deemed appropriate, and as described, for example, in the aforesaid patents, after deposition of the sheet 2 on the stationary bed 4.

The unsaturated polyesters suitable for use in the practice of the present invention are the esterification products of ethylenically unsaturated dibasic acids or their anhydrides, such as fumaric acid and maleic anhydride, or mixtures of such acids or anhydrides with saturated acids or anyhdrides, such as adipic acid and phthalic anhydride with polyvalent alcohols, usually glycols such as ethylene and diethylene glycol. These polyesters are quite readily soluble in styrene and other vinyl monomers to form resin syrups which in the presence of catalysts and activating agents on the stationary bed 4 will polymerize either at room temperature or by the application of heat and slight pressure to solid infusible plastic. The polymerization is exothermic and no volatile by-products are formed. Pure glycol maleate-styrene copolymer is rather brittle in the cured state, but using longer glycols or by replacing part of the maleic acid with long chain aliphatic acids such as adipic acid a tougher and more flexible resin is obtained. The vinyl monomer in the above compositions can be diallyl phthalate which is often used to cross-link the modified maleate polyester resins.

Suitable catalysts for unsaturated polyester compositions as above described are free radical initiators such as peroxides and azo compounds, for example, benzoyl peroxide, tertiary butyl perbenzoate, methyl ethyl ketone and the like. Since most unsaturated polyester compositions evidence a marked tendency to degrade when stored for indefinite periods, they normally include a stabilizing inhibitor such as, for example, tertiary butyl catechol, hydroquinone and the like. The curing catalyst is introduced onto the impregnated sheet 2 normally, as indicated above, at the time the aforesaid sheet 2 is applied to the bed 4.

What is claimed is:

1. An apparatus that comprises a substantially flat horizontally disposed stationary bed, means for attaching a continuous fabric to one end of said bed, a movable carriage mounted thereon and adapted to traverse said bed, a frame mounted on said carriage and adapted for lateral adjustment thereon in a direction substantially at right angles to the direction of movement to which said carriage is adapted, and a treating apparatus disposed thereon and including a mandrel adapted to dispense said continuous fabric therefrom as the carriage is moved across said stationary bed and away from the point of attachment of said continuous fabric, said mandrel being mounted transversely at its opposite ends in rotatable engagement with said frame and adapted to be positioned at different elevations thereon, a receptacle for liquid resin also mounted on said frame and an immersion roll also disposed on said frame and positioned transversely across said receptacle and substantially parallel to said mandrel, said roll being adapted to pass the continuous fabric thereunder assuring its passage through said receptacle thus securing impregnation of said fabric when resin is contained therein and when said carriage is moving across said bed, doctoring means also supported on said frame for controlling the amount of said resin retained on said continuous material after passage thereof through said resin receptacle, and a pressure roll also mounted on said frame and adapted to impress the doctored resin-impregnated continuous material resulting when resin is present in said receptacle against the surface of said bed as said carriage continues its traversal of said bed away from the point of attachment thereto of said continuous fabric.

2. A treating apparatus for producing reinforced plastic sheeting that comprises a frame, a mandrel adapted for free rotation mounted on said frame, said frame being suitable for retaining and dispensing a roll of a continuous fabric, an immersion tank disposed upon said frame adjacent said mandrel and adapted to retain liquid resin for the impregnation of said continuous fabric and to receive the continuous fabric from said mandrel therethrough, a plurality of doctor blades also mounted on said frame adjacent to said tank and adapted to control the amount of resin impregnated in said fabric after passage of the latter through said immersion tank, and rollers adapted to assure transmission of said fabric through said immersion tank and said doctoring means and onto a substantially flat stationary bed, said frame being mounted on a movable carriage and adapted to substantially lateral horizontal movement thereon at substantially right angles to the longitudinal direction of transmittal of said fabric, said movable carriage being adapted to movement parallel to the direction of transmittal of said fabric in guideways positioned along the lateral borders of said stationary bed.

3. A treating apparatus for producing reinforced plastic sheeting that comprises a frame, a mandrel mounted at its opposite ends on said frame and adapted for free rotation thereon; said mandrel being suitable for retaining and dispensing a roll of a continuous fabric, an immersion tank positioned forward and below said mandrel and adapted to contain liquid resin to receive the continuous fabric from said mandrel therethrough, a roller positioned in said tank and mounted between the side walls thereof substantially parallel to said mandrel and adapted to assure passage of said continuous fabric through the tank, doctoring means for controlling and removing the excess of resin deposited on and impregnating said continuous fabric, said doctoring means being mounted on said frame above said tank in such a manner that any excess of resin removed from said fabric returns to said tank, a doctor roll mounted on said frame adjacent to said doctoring means and adapted to secure the passage of said continuous fabric in contiguous relation thereto, a stationary pressure roll mounted on said frame forward of said doctor roll and adjacent to a substantially horizontal stationary bed, and adapted to impress said fabric transmitted from said doctor roll against said bed, said frame being mounted on a movable carriage and adapted to substantially lateral horizontal movement thereon at substantially right angles to the longitudinal path of transmission of said fabric, the outer limits of said movement being the lateral margins of said carriage; said movable carriage being positioned in guideways along the lateral margins of said stationary bed thus adapting said carriage to movement parallel to the path of transmission of said continuous fabric from said mandrel to said stationary bed and onto the surface of the latter, said stationary bed having means at one end thereof for securing a terminal end of at least one panel of said continuous fabric thereto, the fabric from said mandrel being released therefrom in the manner aforesaid as said carriage is moved across said bed from the point of attachment of said fabric to said bed.

4. A treating apparatus for producing reinforced plastic sheeting that comprises a frame, a mandrel adapted for free rotation mounted at its opposite ends upon said frame in a vertically adjustable manner; said mandrel being suitable for retaining and dispensing a roll of a continuous fabric, an immersion tank adapted to contain liquid resin positioned forward and below said mandrel and adapted to receive the continuous fabric from said mandrel therethrough, a roller positioned in said tank and mounted between the side walls thereof substantially parallel to said mandrel and adapted to assure passage of said continuous fabric through the tank; doctoring means mounted on said frame for controlling and removing the excess of resin deposited on and impregnating said continuous fabric, said doctoring means being composed of a stationary doctor bar for removing excess resin from the undersurface of said fabric and an adjustable doctor knife for controlling the amount of resin deposited on the upper surface of said fabric; said bar and knife being mounted on said frame above said tank in such a manner that any excess of resin removed from said fabric returns to said tank, a doctor roll mounted on said frame adjacent to said adjustable doctor knife and adapted to secure said continuous fabric in contiguous relation thereto, a stationary pressure roll mounted on said frame forward of said doctor roll and adjacent to a substantially horizontal stationary bed, and adapted to impress said fabric transmitted from said doctor roll against said bed; said frame being mounted in a laterally adjustable manner on a movable carriage to provide for deposition upon said bed from said frame of a plurality of panels of said continuous fabric impregnated with said resin in contiguous and overlapping side-by-side relation; said movable carriage being adapted for guided traversal across said stationary bed along tracks positioned along the lateral margins of said stationary bed parallel to the path of transmission of said fabric from said frame onto said bed and at substantially right angles to the path of adjustability of said frame mounted thereon; said stationary bed having means provided at one end thereof for securing a plurality of terminal ends of individual panels of said continuous fabric thereto, and the width of said bed being adapted to receive and accommodate an equal number of said panels in contiguous and overlapping substantially horizontal side-by-side relation, the fabric from said mandrel being released therefrom in the aforesaid manner as said carriage is moved across said stationary bed from the individual point of attachment thereto of said fabric.

References Cited by the Examiner

UNITED STATES PATENTS

| 304,457 | 9/1884 | Sagendorph | 118—124 |
| 1,875,701 | 9/1932 | Brownell | 118—124 |
| 2,354,586 | 7/1944 | Fischer | 156—543 XR |
| 2,500,583 | 3/1950 | Smith | 118—419 XR |

FOREIGN PATENTS

| 674,252 | 4/1939 | Germany. |
| 715,911 | 9/1954 | Great Britain. |

EARL M. BERGERT, *Primary Examiner*.